United States Patent [19]

Dorn et al.

[11] Patent Number: 4,661,136

[45] Date of Patent: Apr. 28, 1987

[54] PROCESS OF FABRICATING AN ELONGATED GLASS BODY PARTICULARLY A PREFORM FOR OPTICAL WAVEGUIDES

[75] Inventors: Reimund Dorn, Schwieberdingen; Armin Baumgartner, Ludwigsburg; Anca Gutu-Nelle, Stuttgart, all of Fed. Rep. of Germany

[73] Assignee: International Standard Electric Corporation, New York, N.Y.

[21] Appl. No.: 766,851

[22] Filed: Aug. 16, 1985

[30] Foreign Application Priority Data

Aug. 17, 1984 [DE] Fed. Rep. of Germany ....... 3430265

[51] Int. Cl.⁴ .............................................. C03B 19/06
[52] U.S. Cl. ...................................... 65/18.1; 264/57; 264/60; 264/113; 264/120; 65/3.11
[58] Field of Search .................. 65/18.1, 2, 3.11, 18.2; 264/120, 119, 314, 315, 56, 332, 125, 2.2, 113, 60, 57

[56] References Cited

U.S. PATENT DOCUMENTS

| | | | |
|---|---|---|---|
| 1,599,084 | 9/1926 | Gibson | 264/60 |
| 3,092,878 | 6/1963 | Conger | 264/120 |
| 3,505,158 | 4/1970 | Murray | 264/60 |
| 4,401,615 | 8/1983 | Gerhardson | 264/120 |
| 4,472,350 | 6/1983 | Urano | 264/113 |

FOREIGN PATENT DOCUMENTS

| | | | |
|---|---|---|---|
| 56-32344 | 4/1981 | Japan | 65/18.2 |
| 58-02231 | 1/1983 | Japan | 65/18.1 |
| 925883 | 5/1982 | U.S.S.R. | 65/18.1 |

Primary Examiner—Kenneth M. Schor
Attorney, Agent, or Firm—John T. O'Halloran; Mary C. Werner

[57] ABSTRACT

For fabricating porous bodies from a glass starting material, particularly in connection with the fabrication of an optical waveguide preform, it is proposed to fill powdery glass starting material under a pre-compaction into a compression mold, and to compress it thereafter. When the porous body to be formed is to have a varying composition in the radial direction, as is necessary with a view to step index optical fibers or optical waveguides having a graded index of the refractive-index profile, then differently composed powdery glass starting materials are filled one at a time, in adjacent coaxial areas, into the compression mold. This is effected with respect to each of the individual areas with the aid of a screw conveyor under a continuous, adjustable pressure and at an adjustable conveying speed. If more than two coaxially disposed areas of different composition are to result, the corresponding material is filled several times in succession into the interspace between a base body disposed in the center of the compression mold in the longitudinal direction thereof, and the inside wall of the deposited material, before the central area is filled.

4 Claims, 2 Drawing Figures

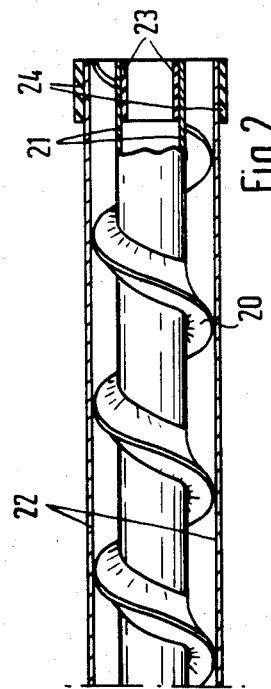
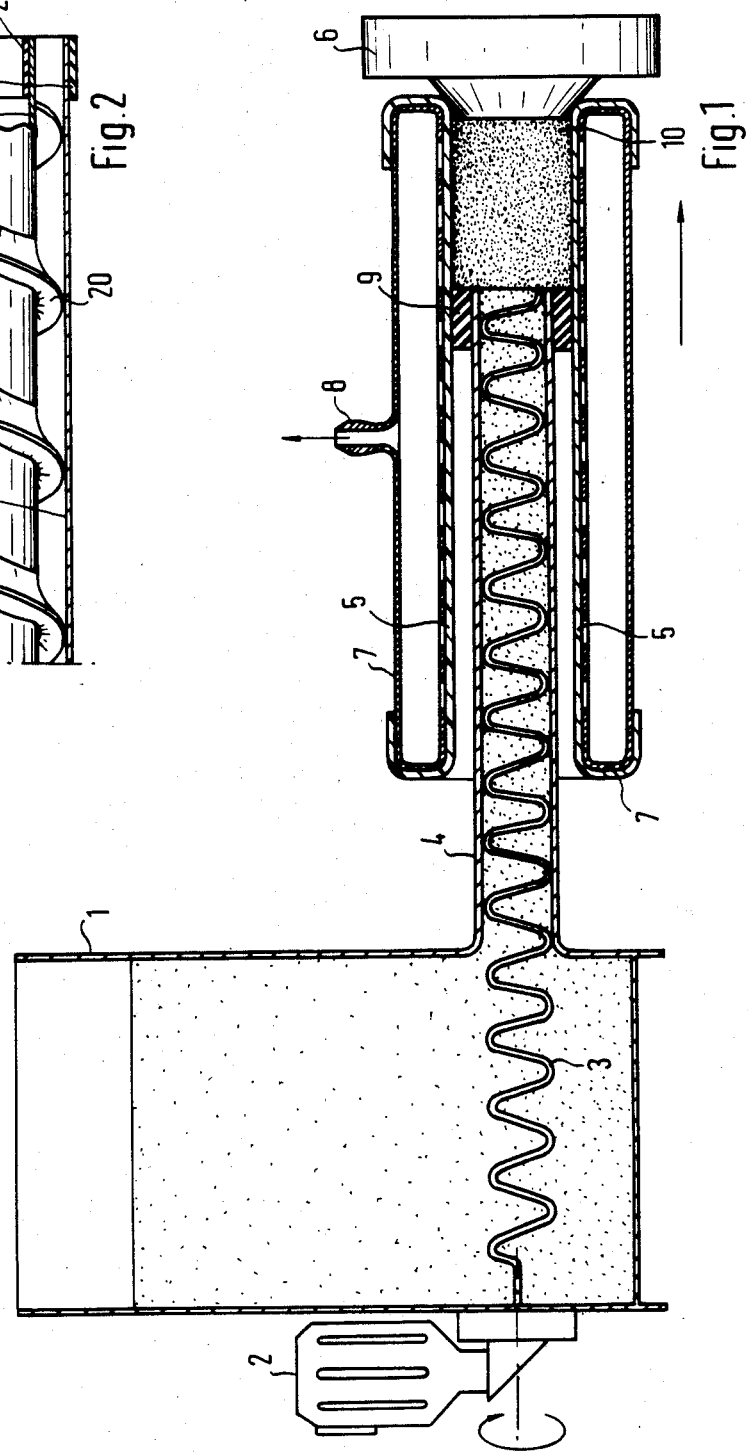

PROCESS OF FABRICATING AN ELONGATED GLASS BODY PARTICULARLY A PREFORM FOR OPTICAL WAVEGUIDES

BACKGROUND OF THE INVENTION

The invention relates to a process of fabricating an elongated glass body, particularly a preform for optical waveguides on the basis of $SiO_2$, in which a porous body is formed from powdery glass starting material and such body is sintered to obtain the glass body.

One such process is described in a copending commonly owned U.S. Pat. application Ser. No. 703,793, in which it is proposed to fill powdery glass starting materials with compositions changing in the radial direction under precompaction, into a compression mold from several coaxially disposed conveyor tubes. The fill-in pressure effecting the pre-compaction is effected therein either by screw conveyors or by a centrifugal force. In any case, the coaxial arrangement of various conveyor tubes and the simultaneous conveyance of different materials involves a considerable investment in appartus, which is a pronounced disadvantage.

SUMMARY OF THE INVENTION

Accordingly, it is a general object of the present invention to avoid the disadvantages of the prior art.

More particularly, it is one of the objects of the invention to provide a process of producing glass bodies from pulverulent material formed into porous bodies and then sintered, which avoids the disadvantages of the conventional processes of this type.

It is yet another object of the present invention to develop a process of this type which would render it possible to fabricate the glass bodies from such porous bodies with a high degree of reliability and dependability.

A concomitant object of the present invention is to provide a process of the above type which allows simplification of the apparatus used to perform the process so that this appartus is simple in construction, inexpensive to manufacture, easy to use, and reliable in operation nevertheless.

In pursuance of these objects and others which will become apparent hereafter, one feature of the present invention resides in a process of fabricating elongated glass bodies, particularly preforms for optical waveguides, from pulverulent starting materials, especially such including $SiO_2$, comprising the steps of filling a plurality of pulverulent starting materials with different compositions one at a time into respective mutually adjacent coaxial confining zones of a confining space in such a manner as to be pre-compacted during the filling step and to form a pre-compacted composite body in the confining space; compressing the pre-compacted composite body subsequently to the filling step to convert the pre-compacted composite body into a porous composite body; and sintering the compressed porous composite body into the glass body.

BRIEF DESCRIPTION OF THE DRAWING

Above-mentioned and other features and objects of this invention will become more apparent by reference to the following description taken in conjuction with the accompanying drawing, in which:

FIG. 1 is a partially sectional side elevational view of a device for filling the powdery starting material into a compression mold illustrative of the type of apparatus usable in performing the process proposed by the invention; and FIG. 2 is a longitudinal sectional view of a part of a conveying device for forming a tubular porous body that is usable in performing the inventive process.

DETAILED DESCRIPTION OF THE PREFERRED EMBODIMENT

In the following, the invention will now be described as it is to be used for fabricating a preform for optical waveguides, with the starting material containing $SiO_2$ as its base material, which, for the purpose of changing the refractive index, contains, as a rule, one or more doping agents such as $GeO_2$, $P_2O_5$, F, or $B_2O_3$. It should be pointed out, however, that the process according to the invention is also suitable for fabricating articles other than optical waveguides, so long as the starting material which comes in question therefor is capable of being manufactured in powder form and of being compressed into a porous body, and the latter is capable of being sintered into a glass body.

The device as shown in FIG. 1 which is identical to that disclosed in the above-mentioned U.S. Pat. application Ser. No. 703,793 and is shown and described here for illustrative purposes only, comprises a storage bin 1 containing the powdery glass starting material, with the interior of the bin 1 being sealed against the ambient atmosphere.

Inside the storage bin 1, near its bottom, there is arranged a screw conveyor 3 which is driven by an external motor 2, with the aid of which the powder material contained in the stroage bin 1 can be conveyed through an elongated conveying tube 4 out of the storage bin 1. The conveying tube 4 projects into a compression mold which is to be filled with the powder material. In the given example, the compression mold is a flexible hose 5 which, at its end lying in the conveying direction, is closed by a cover 6. The fill-in pressure is produced in that the screw conveyor 3 passes the material by the conveying force produced by its motor 2 in direction toward the cover 6, and in that the cover 6 is acted upon by a counterforce in opoosition to the conveying direction.

A shape-stabilizing rigid body 7, constructed as a double-walled tube whose inner wall is perforated as shown in the drawing, and whose inner space between the two walls is capable of being subjected to either an increased or a reduced pressure, surrounds the hose 5 and thus forms a support for the hose 5 in the radially outward direction. To effect a pressure variation, an opening with a tubular joint (or socket) 8 is provided for in the outer wall of the tube 7, on which a conduit leading to a vacuum pump can be slid. The vacuum pump, such as a water-jet pump, produces in the interspace between the walls of the tube 7 a suction pressure which, through the perforated inner wall, acts upon the hose 5, pulls it in direction toward the inner wall and expands it to such an extent as to be smoothly applied to this inner wall. The thus constructed rigid shape retaining body 7, accordingly, simultaneously permits preexpansion of the hose 5 and a shape stabilization of the hose 5 during the fill-in process.

For sealing the interspace between the conveying tube 4 and the pre-expanded hose 5, the outlet end of the conveying tube 4 is surrounded by a sealing ring 9 which is attached to the conveying tube 4 and is operative for providing a constant frictional force between the conveying tube 4 and the pre-expanded hose 5, which force is not dependent on just how far the conveying tube 4 projects into the compression mold 5.

The end of the compression mold 5 lying in the conveying direction is sealed by the already mentioned cover 6 which, on its side facing the compression mold 5, is provided with a truncated cone-shaped extension 10 which is pushed to the end of the tube 7 that is covered by the hose 5, in such a manner that its jacketing surface is firmly applied to the tube end, thus sealing the latter. The cover 6 is attached to the tube 7 with the aid of holding means that is not shown, such as a clamp, which is capable of being mounted to the outside of the tube 7, or by a cap surrounding the cover 6 and capable of being screwed on to the outside of the tube 7.

When filling the powder material into the described compression mold 5, the material is pre-compacted by the action of the fill-in pressure. In the course of this operation, the conveying force of the screw conveyor 3 pushes the entire compression mold 5 inclusive of the shape retaining body 7 in opposition to the counterforce acting upon the cover 6, away from the conveying tube 4 in the conveying direction until, in this way, almost the entire interior space of the hose 5 is filled with the pre-compacted powder material. The motion of the compression mold 5 relative to the conveying tube 4 during the feed operation is indicated by an arrow shown below the compression mold 5, pointing in the conveying direction.

Following the fill-in operation, the vacuum pump is turned off and the air conduit is removed from the tube joint or socket 8. The pre-expanded hose 5, owing to the filled-in pre-compacted powder material, remains in its expanded state. The compression mold 5, inclusive of the shape retaining bod 7 surrounding it, is now removed from the fill-in device and is inserted into the hydraulic fluid of an isostatic press after its other end has also been closed by a cover corresponding to the cover 6 described hereinbefore. The hydraulic fluid of the isostatic press enters through the tube joint or socket 8 into the interspace of the double-walled tube 7, with the air contained therein escaping either through this joint or socket 8 as well, or through a further opening which is additiobally provided but has not been shown. Thereupon, the isostatic press subjects the hydraulic fluid to a pressure ranging between 100 and 300 bar, with this pressure acting through the perforated inner wall of the tube 7 upon the outer side of the pre-expanded hose 5 for pressing the latter together in the radial direction, so that the desired porous body will result. Although the isostatic press exerts a uniform pressure from all sides upon any structure contained in its hydraulic fluid, the pressure, in the present case, owing to the tube ends being closed by rigid covers 6, only acts in the radial direction upon the compression mold 5, so that during the compression process the longitudinal dimension of the filled-in material remains unchanged.

Upon completion of the pressing operation, the tube 7 is removed from the isostatic press, one or both covers 6 are opened, and the compressed body surronded by the hose 5, is removed from the tube 7. After this, the hose 5 is again expanded and the pressed porous body is removed therefrom. Prior to any further processing, it may become necessary to mechanically process the porous body on its surface until it shows to have the desired geometrical shape, for example, by way of grinding the surface.

The porous body is next subjected to a physical and/or chemical cleaning. As a physical cleaning there may be used cleaning in an electric arc or in a high-voltage plasma, and as a chemical cleaning there may be used heat treatment in a chlorine-containing atmosphere in order thus to remove from the porous body an possible impurities in the form of hydroxyl groups and transition metals.

The porous body which, owing to the described process, has a homogeneous material composition, can now be further processed into an optical waveguide, for example, in that it, by way of sintering, is transformed into a glass body, with the latter then being drawn out into a glass fiber.

In principle, the fill-in operation as described with reference to FIG. 1 can also be applied to such cases in which the porous body to be formed has no homogeneous composition, but a material composition changing in the radial direction. This is possible in that, in contradistinction to the foregoing part of the specification, where the compression mold 5 was described as having the shape of a hollow cylinder, so that the subsequently following compression would in any case result in a rod-shaped porous body, is designed in such a way that the resulting formed porous body is of tubular shape. For this purpose there is used a screw conveyor which, unlike the screw conveyor 3 as shown in FIG. 1, does not convey the material within the area of its axis, but within an area having a circular ring-shaped cross section disposed coaxially in relation to its axis of rotation. One such screw conveyor is shown in FIG. 2.

This type of screw conveyor 20 rotates in the interspace between an inner tube 21 and an outer tube 22 disposed coaxially in relation thereto, about the inner tube 21, so as to convey the powdery glass starting material through this interspace into the compression mold 3 and into an area coaxially distant from the axis.

At its front end, the arrangement as shown in FIG. 2 comprises two sealing rings 23 and 24 for sealing the area within which the powdery material is conveyed into the compression mold and which, just like the sealing ring 9 in the arrangement as shown in FIG. 1, provide for a constant position-independent frictional force. The inner sealing ring 23 is mounted to the inside of the inner tube 21 and is applied to the outer side of the rod-shaped or tubular base body, whereas the outer sealing ring 24 is mounted to the outer side of the outer tube 22 and is applied to the inner side of the hose 5 in the case of the compression mold 5 as shown in FIG. 1.

As the compression mold 5 for forming a tubular body there may be used either the type of compression mold 5 as shown in FIG. 1, which would have to be slightly modified, or else a compression mold as shown in FIG. 2. The modification of the compression mold 5 as shown in FIG. 1 consists in that, along its longitudinal axis and extending from one to the other end thereof, there is disposed a rod or a tube, for example, of silica glass which can be mounted e.g. at the cover 6 in a central recess and, following the fill-in process, in a corresponding recess of the other cover. The screw conveyor of the type as shown in FIG. 2 now conveys the powdery material in a way corresponding to that described hereinbefore with reference to FIG. 1, into the interspace between this rod or tube and the pre-expanded hose 5. Following the compression process, the rod-shaped or tubular base body can be easily removed from the center of the compressed porous body.

According to the invention, the filling of the compression mold which is shown in FIG. 1, is carried out as follows: as proposed above with respect to the fabrication of a tubular body, also with the process according to this invention, a rod-shaped base body, that is, a rod or a tube, for example, of silica glass, is disposed in the compression mold which is modified to accommodate such base body along the longitudinal axis by extending in the center from the one end to the other, and a powdery glass starting material is filled in such a way into the interspace between this base body and the inside wall of the compression mold with the aid of a screw conveyor, as to be pre-compacted in the course of this filling operation. The filled-in material, for example, has a composition which is suitable for the cladding of an optical waveguide. By the pre-compaction, the filled-in material is given such a consistency that the base body, upon completion of the fill-in process, can be removed without the filled-in material dropping into the resulting hollow space. It was surprisingly discovered that it is indeed possible to give the particulate material during the filled-in process such a consistency that the thus formed tubular body will be self-supporting and will thus serve to externally delimit the internally located confining zone, thus in effect serving as a mold for the following filled-in operation. Upon removal of the base body, a further powdery glass starting material in a different composition, such as core material, and likewise under a pre-compaction, is filled into the hollow space.

When this last mentioned material is to have a composition which is constant throughout the cross section, it is filled in in the way as shown in FIG. 1, with the aid of a centrally disposed screw conveyor and with the previously filled in tubular body serving to externally delimit the space being filled. When the composition of the material is to vary throughout the cross section, as is necessary for an optical waveguide having a graded index profile, then, following the removal of the base body, another base body of smaller diameter is disposed in the center of the hollow space along the longitudinal axis, and a powdery glass starting material of a still different composition is filled into the interspace with the aid of a screw conveyor of the type as shown in FIG. 2 which is adapted to the interspace, and under a precompaction, with the base body thereafter being removed and the next base body being introduced, etc., until finally the remaining hollow space is filled with a material suitable for the central area, with the aid of a centrally disposed screw conveyor. Accordingly, the first fill-in process is repeated several times with a varying material composition, with respectively a different base body and a screw conveyor adapted thereto, until the remaining hollow space is filled.

The process described hereinbefore, in which the adjacent coaxial areas of the compression mold are filled one at a time in turn, offers the advantage that each of the different fill-in steps can be controlled individually and independently of the others with respect to the fill-in pressure and the fill-in speed.

It should still be mentioned that in every phase of the described process, from the stage of fabricating the powdery starting material to the sintering into an elongated glass body suitable for use as a preform, care must be taken for preventing the material from becoming contaminated.

For this purpose, it is preferable for the storage bins containing the powder material to be always airtightly sealed, and for the feeding of the material into the compression mold to be carried out in a sealed atmosphere, for example, in an evacuated glove box. Into this glove box, the one conveyor tube or a plurality of such conveyor tubes projects from the outside through a vacuum-sealed passage. The compression mold is removed from this glove box only after it has been closed on both sides with a cover, and is then placed into the isostatic press.

A further measure for avoiding contaminations resides in that the heat treatment of the porous body is carried out in a chlorine-gas atmosphere, with the subsequent sintering into a glass body being carried out in an apparatus which is constructed to keep the porous body, during the heat treatment in the chlorine-gas atmosphere, for example, in that the porous body is moved from a low elevation toward a higher elevation through a first zone in which the heat treatment is carried out, and from there immediately into a second zone in which the sintering is carried out.

While we have described above the principles of our invention in connection with specific apparatus, it is to be clearly understood that this description is made only by way of example and not as a limitation to the scope of our invention as set forth in the objects thereof and in the accompanying claims.

We claim:

1. A method of making a glass preform comprising the steps of:
providing an elongated, hollow mold member having a flexible sidewall, one open end and a closed end opposite thereto;
placing a first of a plurality of base bodies into the mold member to extend axially from the closed end to the open end to form an interspace between the mold member and the base body;
applying a longitudinal force against the closure at the closed end so that the force acts upon the closure and upon the mold member in the direction of the open end;
forming a pre-complacted self-supporting body by filling the interspace with a first of a plurality of glass forming pulverulent materials which is forced into the open end so that the increase in mass of material resulting from the filling causes the material to act against the closed end in opposition to the longitudinal force thereby moving the mold member against the longitudinal force;
removing the base body thereby forming a central cavity surrounded by the interior walls of the self-supporting body.
reapplying a longitudinal force against the closure at the closed end so that the force acts upon the closure and upon the mold member in the direction of the open end;
filling the central cavity in the self-supporting body by forcing an additional glass forming pulverulent material into the open end so that the increase in mass of material resulting from the filling causes the additional material to act against the closed end in opposition to the longitudinal force thereby moving the mold member against the longitudinal force;
compressing the material and the additional material to form a porous body; and
sintering the resulting compressed composite material to form the glass preform.

2. The method of claim 1 further comprising, prior to the reapplying step, the further steps of:
  inserting another base body of the plurality into the central cavity to extend axially from the closed end to the open end, the additional base body having a diameter which is smaller than that of the previous self-supporting body to form interspace between the self-supporting body and the base body;
  exerting a longitudinal force against the closure at the closed end so that the force acts upon the closure and upon the mold member in the direction of the open end;
  forming an additional self-supporting body which contacts the previously formed self-supporting body by filling the interspace with another glass forming pulverulent material of the plurality which is forced into the open end so that the increase in mass of material resulting from the filling causes the another material to act against the closed end in opposition to the the longitudinal force thereby moving said mold member against the longitudinal force; and
  removing the another base body thereby forming a central cavity surrounded by the interior walls of the additional self-supporting body.

3. The method of making a glass preform according to claim 2 comprising repeating said further steps at least once.

4. The method of claim 1 wherein either of or both of said filling steps includes utilizing feeding means for forcing the pulverulent material into said mold member and wherein said feeding means is intially provided adjacent the closed end of the mold member so that the movement of the mold member provides more volume for filling.

* * * * *